F. W. B. SCHORADT.
ADDING AND TYPE WRITING MACHINE.
APPLICATION FILED MAY 16, 1912.

1,313,230.

Patented Aug. 12, 1919.
7 SHEETS—SHEET 1.

WITNESSES:

INVENTOR
BY
ATTORNEY

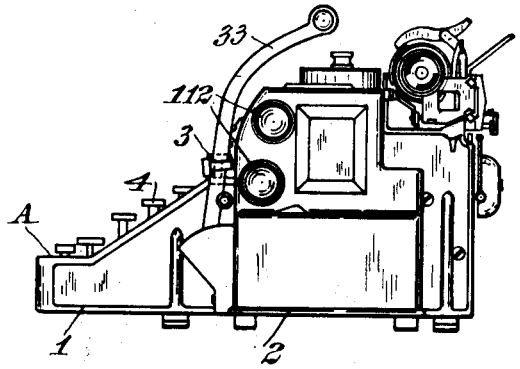
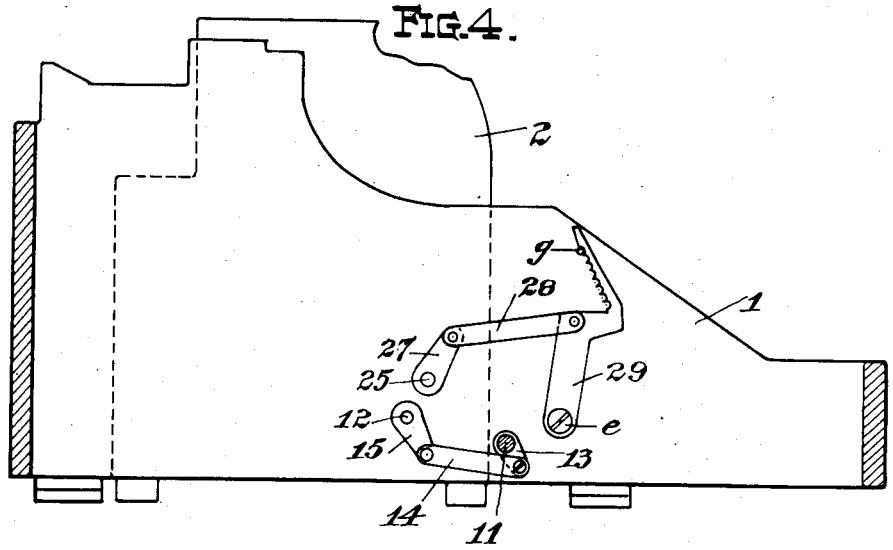

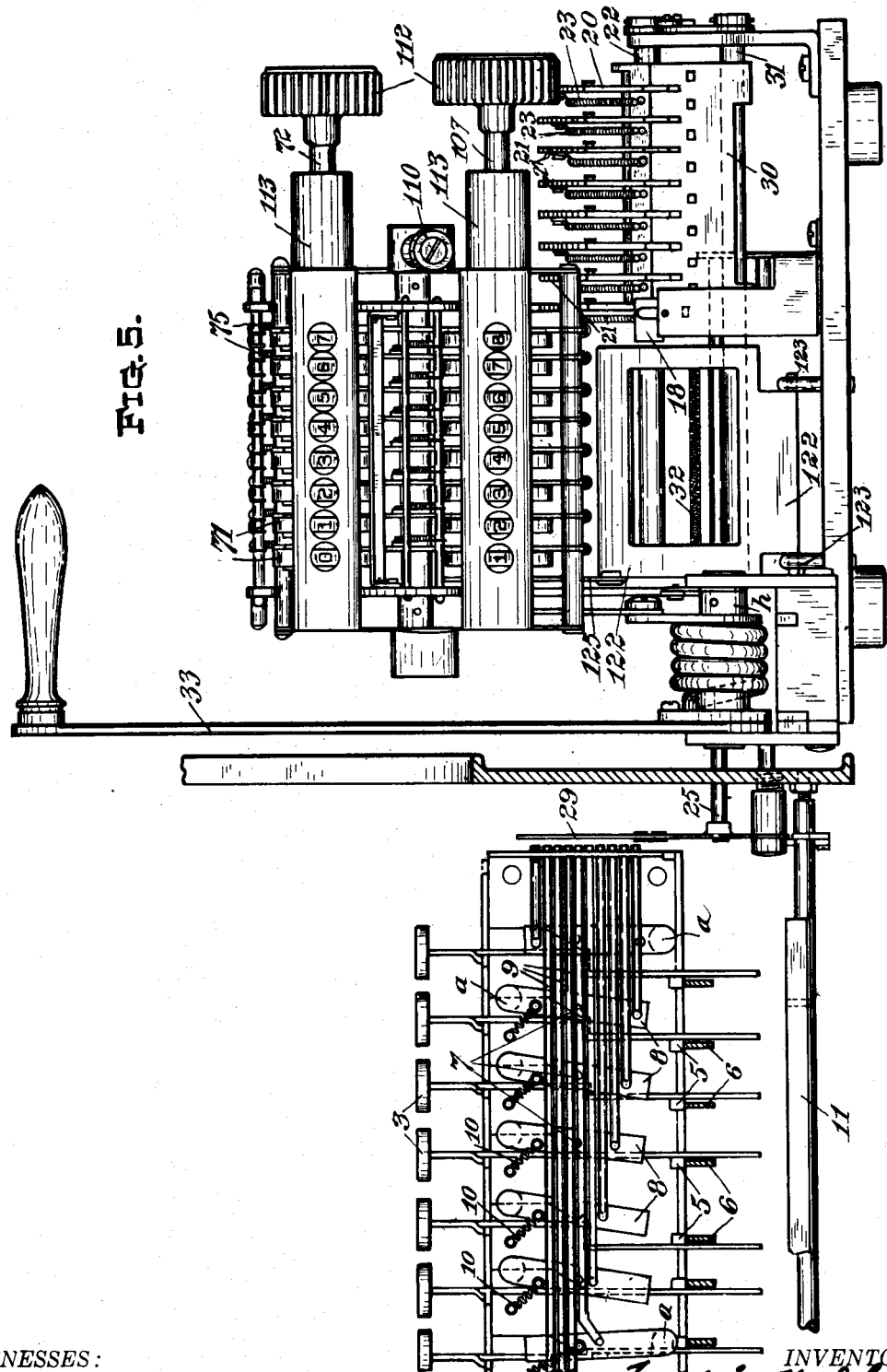

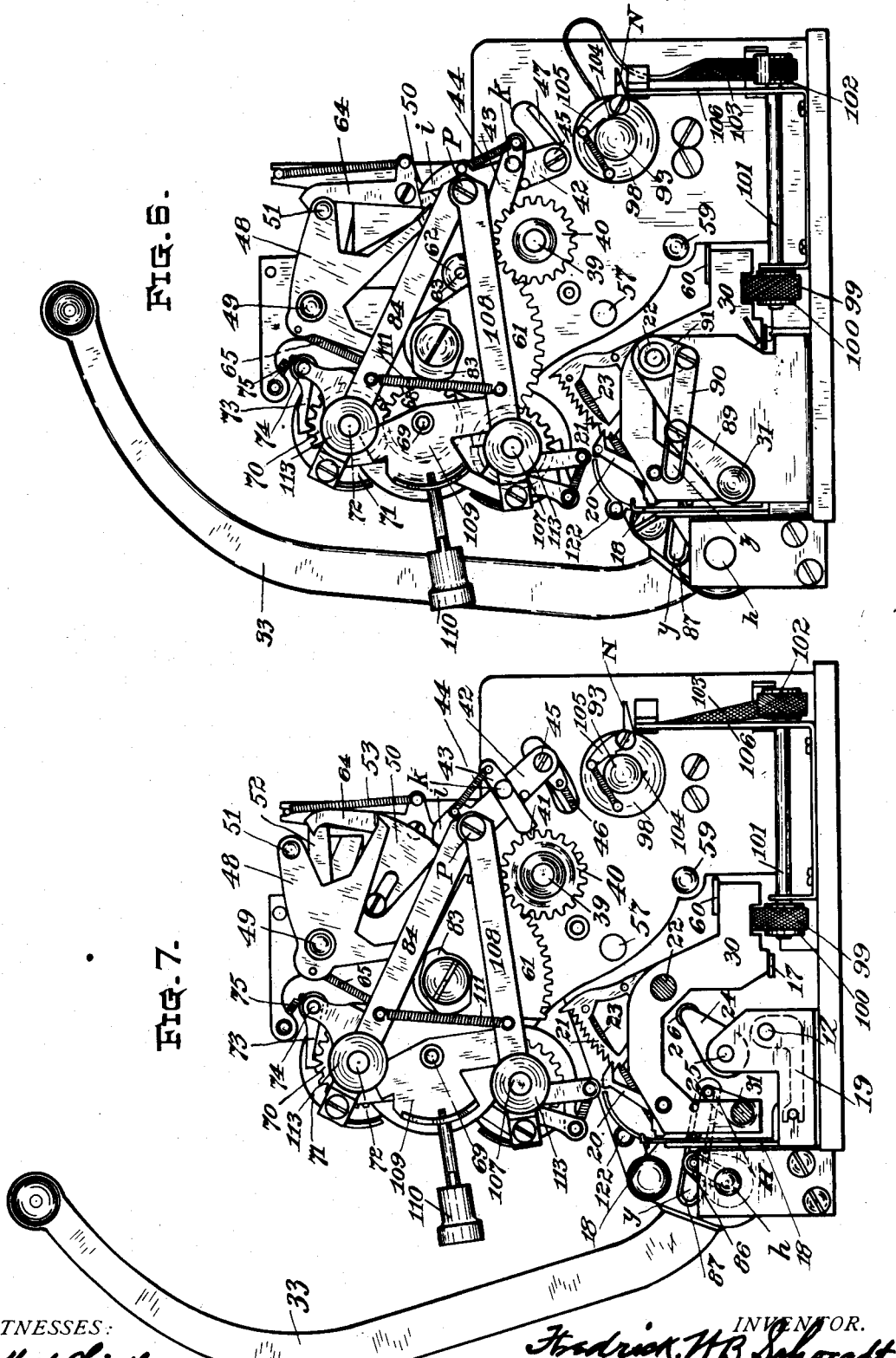

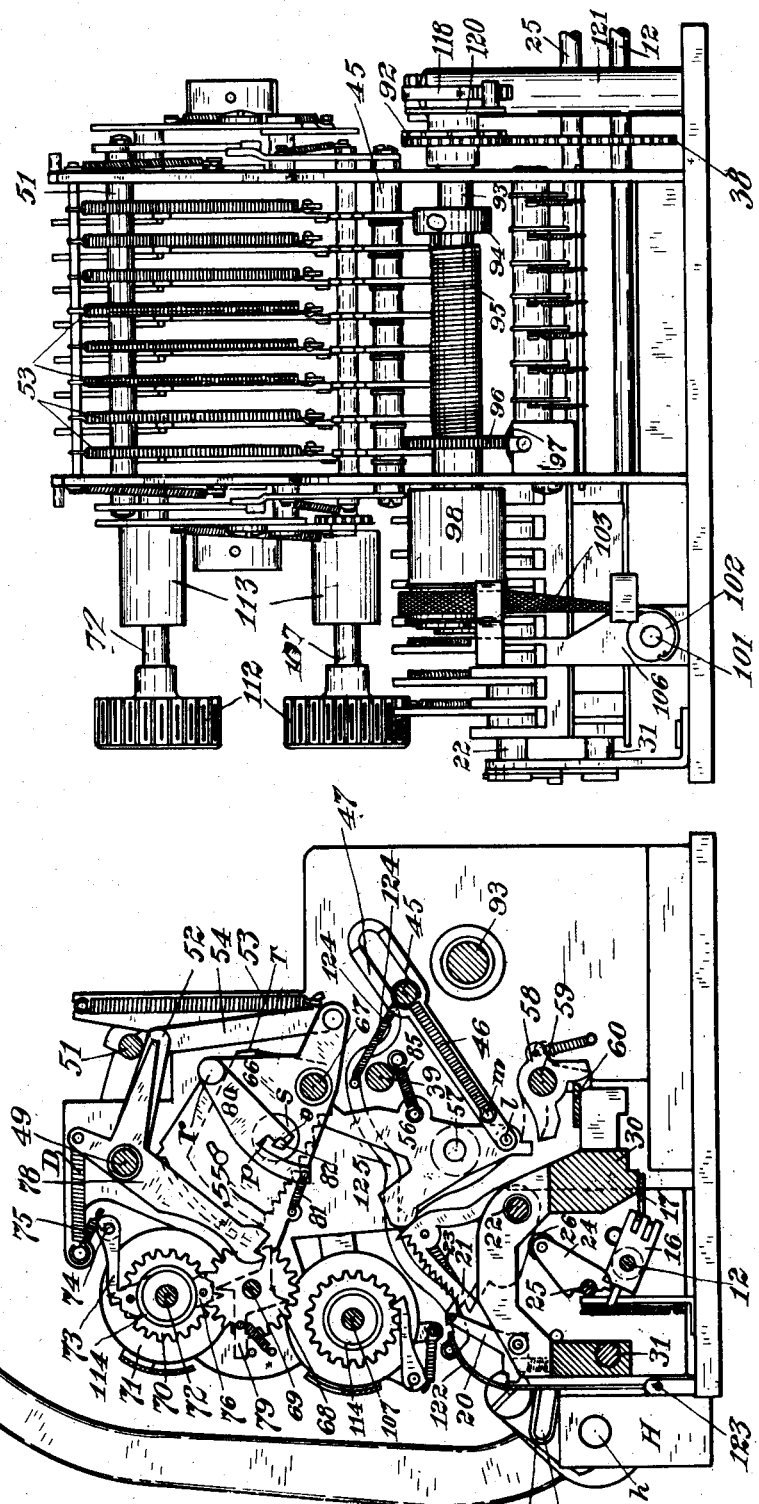

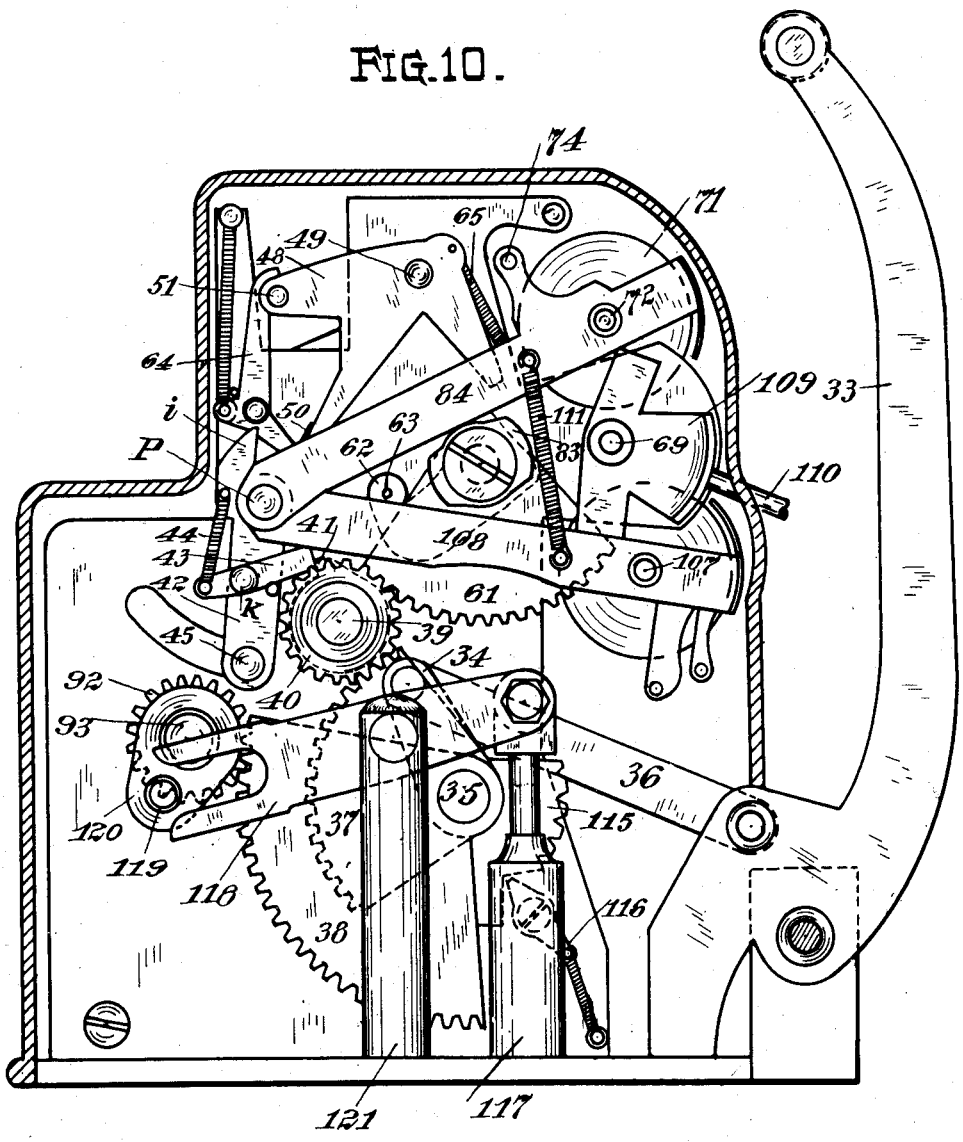
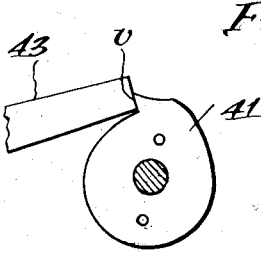

F. W. B. SCHORADT.
ADDING AND TYPE WRITING MACHINE.
APPLICATION FILED MAY 16, 1912.
1,313,230.
Patented Aug. 12, 1919.
7 SHEETS—SHEET 7.
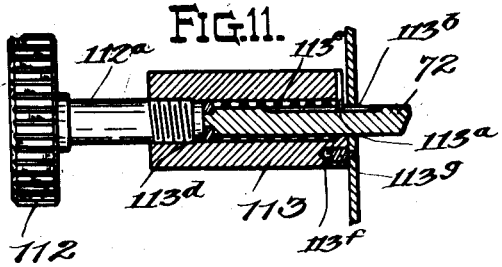
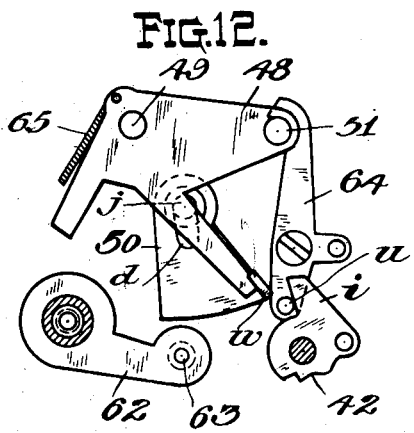
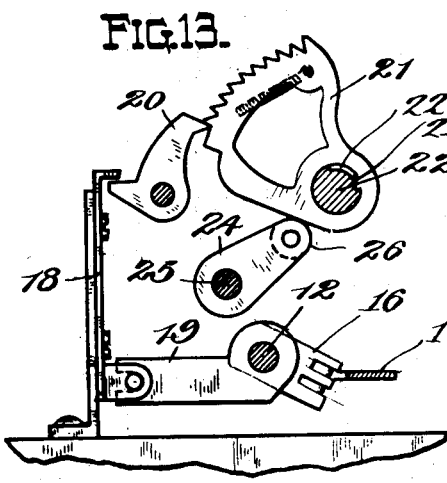
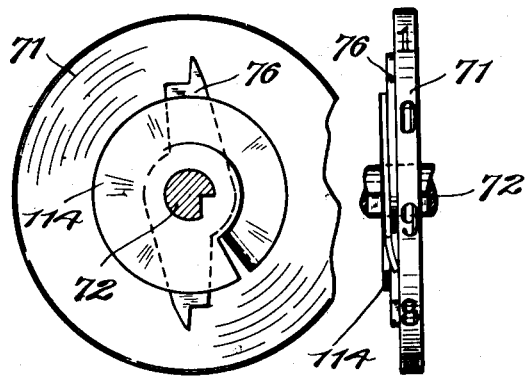
WITNESSES:
INVENTOR.
F. W. B. Schoradt
BY
ATTORNEY.

UNITED STATES PATENT OFFICE.

FREDRICK W. B. SCHORADT, OF KITTANNING, PENNSYLVANIA, ASSIGNOR TO SIDNEY L. KAUFMAN, OF KITTANNING, PENNSYLVANIA.

ADDING AND TYPE-WRITING MACHINE.

1,313,230.

Specification of Letters Patent.

Patented Aug. 12, 1919.

Application filed May 16, 1912. Serial No. 697,646.

*To all whom it may concern:*

Be it known that I, FREDRICK W. B. SCHORADT, a subject of the Emperor of Germany, residing at Kittanning, in the county of Armstrong and State of Pennsylvania, have invented a new and useful Improvement in Adding and Type-Writing Machines, of which Improvement the following is a specification.

My invention relates to improvements in combined typewriter and adding machines.

The objects of my invention are first, to produce a combined typewriter and adder in which two sets of keys constitute the keyboard, the typewriter keys being independent of, and capable of operation independent of the adder keys, the adder keys, however, although independent of the typewriter keys, being capable of actuating corresponding typewriter keys; second, to produce a combined machine of the character specified, in which all the operative movements of the adding machine are produced by mechanism independent of the keys, although the initial movement is produced by the depression thereof; third, the production of means controlled by the keys to determine and regulate the extent of movement of individual members of the receiving mechanism; fourth, to produce means to pull or position the receiving mechanism under or into alinement with the adding mechanism, whereby adding is performed without the use of the usual tabulator stops and column selector, and irrespective of the position of the typewriter carriage, and, finally, the production of a compact and simple machine of the type specified by the novel combination and arrangement of parts hereinafter more specifically described, reference being had to the accompanying drawings forming part hereof, in which—

Fig. 3 is a side elevation looking toward the left.

Fig. 4 is a detail view of the mechanism which controls the movement of the ratchet sectors, said mechanism being mounted on the inside of the frame of the typewriter at one side thereof.

Fig. 5 is a front elevation with the cover of the adder removed and typewriter and keyboard broken away to show operative parts.

Fig. 6 is a side elevation of adder looking toward the left, the cover and zero knobs removed.

Fig. 7 is the same showing machine in action, handle or lever being moved about 15°, part of the carriage being broken away to show operative parts more clearly.

Fig. 8 is adder with right hand controlling mechanism and side frame removed showing details of carriage of receiving mechanism, adding mechanism, and carrying device.

Fig. 9 is a rear view of the adder with cover removed.

Fig. 10 is a left hand side elevation of adder looking toward the right, showing controlling mechanism.

Figure 1:
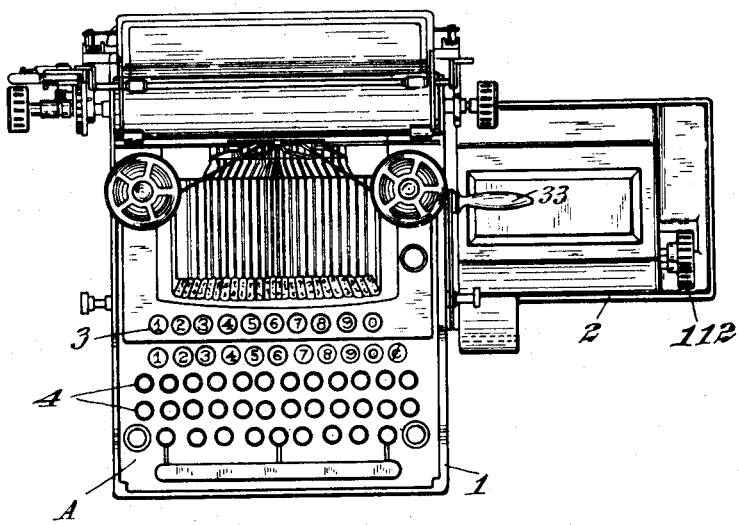
Figure 1 is a plan view of my improved machine.
Figure 2:
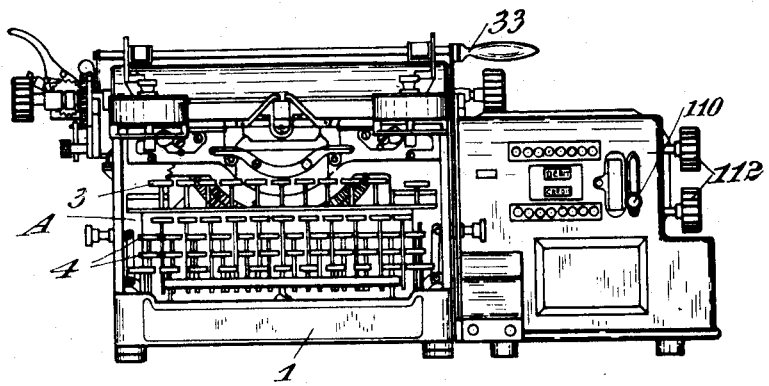
Fig. 2 is a front elevation thereof.

Fig. 10ᵃ is a detail view.

Fig. 11 is an enlarged view of one of the knobs and shaft on which the same is mounted showing also the sleeve in section.

Fig. 12 is an enlarged detail view of the gravity pawl and associated parts.

Fig. 13 is an enlarged detail view of the pawl trigger and associated mechanism.

Fig. 14 is a fragmentary elevation of the zero washer, and

Fig. 15 is a front elevation of one of the numeral wheels.

Referring to said drawings, 1, 2 are respectively the frame of the typewriter and adder. The typewriter may be of the usual type and construction, as the adder can be applied to any form of typewriter with little or no alteration in connecting keyboard of adder with keyboard of typewriter, and little or no alteration in the typewriter proper. The typewriter need not be more specifically herein described. I have shown the adder applied to the typewriter known as the Pittsburgh Standard No. 11. A is the keyboard which comprises a row of adder keys 3 and the usual typewriter keys 4. Both sets of keys are independent of each other, the typewriter keys being adapted to be operated in the usual manner without in any wise interfering with the operation of the adding machine. The actuation of any of the adder keys, however, operates a corresponding typewriter key, the adder keys having studs 5 which when said keys are depressed engage upon or against the corresponding typewriter keys 6, 6 whereby the type bars are actuated. When operated the inclined or cam surfaces of the adder keys, shown in dotted lines, Fig. 5 will contact with, and push the studs 7, which are secured to the arms 8, 8 which are pivoted at *a;* and thus oscillate or swing said arms upon their pivotal connection, thereby reciprocating or moving rods 9, 9 connected to each of said arms 8. The motion thus imparted to the arms 8 causes the said rods to move laterally outward or toward the adding machine, each key when actuated operating a corresponding rod in this manner. The free end of that one of the rods 9 which is actuated by the depression of one of the adder keys 3 is projected into the path of the member 29, so as to limit the swinging movement of the said member 29, in a manner to be hereinafter more fully described. Upon the release of the key, any one of the rods thus operated is returned to its normal position by means of the spring 10, the ends of which are connected to the arm 8 and to the frame respectively, as shown in Fig. 5. When the adder keys are operated the downward movement thereof causes the lower ends to engage upon and rotate a universal bar 11, which is pivotally secured in the frame of the machine longitudinally thereof. The rotation or movement of bar 11 is communicated to escapement shaft 12 which extends longitudinally of the adding machine, by means of the arm 13 which is mounted on said bar 11, and link 14 which connects the lower end of said arms 13, with an arm 15 mounted upon the escapement shaft 12 (as shown in Fig. 4.) The connection between the universal shaft 11 and escapement shaft 12, shown by Fig. 4, is located within the frame of the typewriter and adjacent to the side thereof. The rotation of said escapement shaft 12 disengages escapement mechanism 16 from the escapement rack 17, (as shown in Figs. 8 and 13) and at the same time operates the pawl trigger 18, connected to the arm 19 mounted on said shaft 12, (as shown in Figs. 7 and 13). The downward movement of the trigger disengages pawl 20 from the ratchet sector 21 (as shown in Figs. 7, 8 and 13) loosely mounted upon the shaft or rod 22, and the said sector is caused to swing forward and downward upon said shaft 22 by the extended spring 23, the tension of which draws the sector into contact or engagement with an arm 24, mounted on shaft 25 (Fig. 13), thereby rotating said shaft 25, the upper end of said arm 24 having a roller 26 to reduce friction. The shaft 25 extends longitudinally, through the adding machine, and upon the end thereof, within the typewriter is mounted an arm 27, (Fig. 4) to the upper end of which is connected a link 28, the opposite end of which is connected to an arm 29 which is pivoted to the frame at *e*, the upper end of said arm having preferably a series of teeth or serrations *g* corresponding in number with the adder keys and the number of teeth on ratchet sector 21, the serrations *g* being so gaged as to coöperate with the rods 9 to limit the travel of arm 29 and thereby through the medium of link 28, arm 27, shaft 25 and arm 24 limit or control the swing of ratchet sector 21 in accordance with the value of the adder key depressed, the carriage 30, in which the sectors 21 are loosely mounted being drawn under the adding mechanism proper at the rate of one ratchet sector 21 at every depression of the adder keys. Thus the amplitude of movement of each of the ratchet sectors 21 is controlled successively by the value of the adder keys depressed.

The mechanism and operation described serves to set or position one sector or individual member of the receiving mechanism of the adding machine, which comprises the series of sectors and the carriage 30. It will be noted that there are a plurality of sectors, capable of being successively operated by the keys, of the adder keyboard as described. The successive operations of these sectors is what I term loading the machine, and the sectors 21, pawl 20 and carriage 30 mounted on shafts 22 and 31 constituting what I term the receiving mechanism of the adding machine.

During the operation of loading or charging the receiving mechanism as described which consists in actuating successively the sectors 21 mounted on shaft 22, on which shaft and shaft 31 the carriage 30 is mounted, the carriage is pulled forward step by step by means of spring 32, one end of which is attached to the frame and the opposite end to the carriage (as shown in dotted lines Fig. 5), the various ratchet sectors 21 being thus brought successively into position to be charged and then moved under the numeral wheels. In charging the machine, the several ratchet sectors 21 are successively positioned as the adder keys are operated, and in the movement of each ratchet sector 21 the pawl 20 escapes from the trigger pawl 18 slightly in advance of the arm 24 and engages ratchet sector. This locks the particular sector 21 actuated and it remains set until returned to its original position by means of the handle or lever 33, as will be later herein described.

The operation described enables the charging of the receiving mechanism of the adding machine, the carriage being pulled under the recording mechanism from right to left according as the adder keys are operated, and the set members or sectors may then be transferred from the receiving mechanism to the recording mechanism by means of lever 33 and mechanism controlled thereby. This makes it possible to tabulate and add without column selector, and irrespective of the position of the typewriter carriage and tabulator stops. Suppose 9 is to be added to any given figure, the operation of key 9, of the adder keyboard, and mechanism controlled thereby, will cause the ratchet sector 21 then opposite and in operative relation to pawl trigger 18 to swing, in this instance to its full extent and until it is stopped by the engagement of one of the bars 9 with the last notch $g$ in the arm 29, (as shown in Fig. 4), as heretofore described, and the sector will then move opposite the first column of the adding machine. By pulling the lever 33 which is pivotally connected to the frame at $h$ forward, motion is communicated to arm 34 (as shown in Fig. 10) mounted upon the stud 35 through link 36, one end of which is connected to said lever and the opposite end to said arm, thereby actuating sectors 37 and 38 attached to said arm 34. The motion communicated to said sector 37 is transmitted to shaft 39 by means of the gear wheel 40 mounted thereon which meshes with said sector. A cam 41 attached to one side of said gear wheel, (as shown in dotted lines Figs. 6, 7 and 10) is provided with a notch or projection V which engages against one end of the pawl or arm 43, secured to an arm 42 at K, as shown in Fig. 10, the opposite end of said pawl being connected to the lower end of the spring 44, the tension of which holds said pawl against said cam. The upper end of said spring is secured to said arm 42, the lower end of which carries a rod 45 which is loosely seated in the bifurcated ends of the forks 47 and in the slot 47' in the frame. The rotation of the gear 40 carries the notch or projection V on the cam 41 against the end of the pawl 43, thereby moving the same upward and rearwardly of the machine, as shown in Fig. 7 and carrying in the same direction the lower end of the arm 42, as shown in Fig. 7.

This movement of the arm 42 extends the springs 46, one end of each of which is attached to said rod 45 and the opposite end to the respective fork 47 at $m$; and also swings the nose $i$ of the arm 42 into engagement with a pin $u$ on the lower end of the lock pawl 64 (see Fig. 12) thereby oscillating or swinging said pawl on its pivotal support, and throwing the upper hooked end thereof out of engagement with the universal bar 51 carried by the universal bar arms 48, which are mounted on the shaft 49 secured in the upper part of the frame. As said pawl 64 swings on its pivotal support the nose or extension $i$ of the arm 42 contacts with the gravity pawl 50, mounted at one side of said bar arm 48 on a stud $j$ which projects in a slot $k$ formed in said gravity pawl, the said gravity pawl having a formed over part $w$ which contacts with said nose $i$ and with the member of the bar arm 48 nearest the pawl 64 (as shown in Fig. 12) and holds the universal bar arm 48 in the position shown in Figs. 6 and 12, and prevents movement thereof until the gravity pawl 50 is moved out of contact with the nose $i$ of the arm 42, as hereinafter described.

Sector 61 which meshes with and receives movement from the gear 40 on shaft 39 is provided with an arm 62 having thereon a stud 63, (Figs. 10 and 12), which is adapted to be swung in contact with the gravity pawl 50 so as to slide the same upwardly on the stud projecting in the slot formed therein and thus lift the gravity pawl out of contact with the nose $i$ of the arm 42.

A further rotation of the sector 61 carries the arm 62 into engagement with the member of the universal bar arm 48 farthest removed from the lock pawl 64, thereby causing the said arms 48 mounted on said shaft 49 to swing downwardly thereby bringing the universal bar 51 carried by the arms 48 again into engagement with the arms 52. The said arms 52 are thus moved downwardly a slight amount so as to overcome the action of the tension springs 53, the lower end of each of which is secured to the respective link 54 and the upper end thereof to the frame. Each link 54 is connected at its upper end to an arm 52 and at its lower end to one of the registering sectors 66, (see Fig. 8) the said sectors being pivotally mounted upon the shaft 67 and each having a pivoted stop plate or seat 55 applied to the side thereof, the said stop plate 55 being also mounted upon the shaft 67. (See Fig. 8.) The initial downward movement of the universal bar 51 moves the rear end of each of the registering sectors 66 downwardly and thereby lifts the forward end of the registering sector and the toothed lower edge portion of the stop plate or seat 55. At the instant the toothed edge of the stop plate 55 is thus lifted out of engagement with the registering pawl 56 (see Fig. 8), the said pawl which is mounted upon shaft 57 is moved against the ratchet sector 21 by the action of the spring 46. The magnitude of the movement thus imparted to the registering pawl 56 depends upon the movement imparted to the ratchet sector 21 when charging the machine and in the present instance the registering pawl would swing to the extreme limit of its movement, since the key for the numeral 9 was depressed when charging the machine and the ratchet sector 21 permitted to swing the full distance of the 9 notches.

Locking pawls 58 which are mounted on the shaft 59 will prevent all registering pawls 56 lying to the left of the carriage 30 from leaving their position, since the lock shift 60, which is a part of the carriage 30, will only act as far as the carriage travels. The forks 47 serve as supports for the springs 46 and are connected at their lower ends to the respective registering pawls 56, the upper bifurcated ends of the forks straddling and loosely receiving the shaft 45 as heretofore described.

Immediately the gravity pawl is released from contact with the nose $i$ of the arm 42 the retraction of spring 65, one end of which is secured to the bar arm 48, throws said bar arm and with it the gravity pawl upwardly and forwardly of the machine lifting the universal bar 51 carried by said arm, out of contact with the arms 52 (as shown in Fig. 7). The arms 52 are then released and the springs 53 permitted to act upon the registering sectors 66 so as to rotate the same until the toothed lower ends of the stop plates or seats 55 are brought into engagement with the upper ends of the various registering pawls 56. The magnitude of the movement which can thus be imparted to each registering sector 66 depends upon the magnitude of the movement which the corresponding pawl 56 is enabled to make before being brought into contact with the ratchet sector 21. The various parts are so proportioned that the magnitude of the swinging movement thus imparted to the registering sector 66 before it is stopped by contact of the stop plate 55 with the upper end of the registering pawl 56 is proportional to the numerical value of the key 3 which was operated when charging the machine. Each step of the toothed or notched lower end of the stop plate 56 corresponds to the travel of one tooth on the registering sector 66, said stop plates 55 and sector 66 being attached together and mounted on the same shaft 67.

Each registering sector 66 meshes with and transmits movement to a gear wheel 68 mounted on a shaft 69 (dotted lines Fig. 8). This gear wheel 68 meshes with and transmits movement to a numeral gear 70 which is mounted on the shaft 72 and is rigid with the numeral wheel 71. This numeral wheel 71 is provided on its periphery with two sets of digits running from 0 to 9, as shown in Fig. 15, and the numeral gear 70 is provided with twenty teeth. A pawl 73 mounted on shaft 74 serves to prevent accidental rotation of the numeral gear 70 and to retain the numerals upon the various numeral wheel 71 in alinement when the shaft 72 is swung upwardly to disengage the numeral gear 70 from the gear 68. A spring 75 is provided for holding this pawl 73 yieldingly in position.

A carrying finger 76 (see Figs. 14 and 15) is attached to one side of each of the numeral wheels 71, being in effect part of the numeral wheel gear. This finger is so disposed as to strike at the proper time the trigger 79 which is loosely mounted on the shaft 69. When this trigger is thus struck a hammer 78 which is mounted on shaft 49 is released and swung into engagement with the carrying pawl 80 by the spring D which is attached to the upper end thereof. This carrying pawl 80 is at its upper end pivotally connected to the registering sector 66 at $r$, while the curved lower end thereof is connected to a weak spring 81, the function of the said spring 81 being to normally maintain the carrying pawl in the position shown in Fig. 8.

The lower end of the carrying pawl has a notch therein which is provided with two seats $o$ and $p$, the said seats being adapted to engage a stud 82 which is carried by the stop plate or seat 55 and projects through an opening $s$ in the registering sector 66. This stud 82 is normally engaged by the seat $o$ as shown in Fig. 8, although when the carrying pawl 80 is struck by the hammer 78, the said pawl 80 is disengaged from the seat $o$ and brought into engagement with the seat $p$, thereby shifting the relative positions of the registering sector 66 and the stopper or seat plate 55 so as to permit the registering sector 66 to swing downwardly, one tooth farther than it would otherwise be permitted to swing, thereby adding one to the column so operated. In other words, one is carried from one column to the next column. It will be obvious that one of these registering sectors 66 and associated mechanism is provided for each of the ratchet sectors 21, so that after the various ratchet sectors have been operated in charging the machine, they can all be simultaneously unloaded and the number transferred to the adding or totaling mechanism. In operating the machine the handle or lever 33 is moved into the position shown in Fig. 7 to unload the receiving mechanism and transfer the numeral to the adding or totalizing mechanism. Upon a further and full movement of the operating lever 33 downward the rotation of shaft 39 will throw cam 41 on the gear 40 out of contact with the pawl 43, and thereby permit the spring 46 to return the lever 42 to normal position. The motion transmitted from the gear 40 to the sector 61 operates the cam 83 mounted thereon and thereby lifts the arm 84 which is pivoted at P and carries the shafts 72 and 74 upon which the numeral gear 70 and pawl 73 are respectively mounted. The numeral gears 70 are thus lifted out of engagement with the gears 68 so that the said gears 68 can rotate freely without moving the numeral wheel 71. As heretofore specified, the arm 62 on the sector 61 will have engaged the gravity pawl 50 and forced the same out of contact with the nose $i$ of the arm 42 and the continued rotation of said arm 62 will cause the same to engage the member of the universal bar arm 48 farthest removed from the pawl 64 and swing the said bar arm into the position shown in Fig. 12, in which position it will be retained by the pawl 64. The action of said arm 62 upon the bar arm 48 will distend the spring 65. When the universal bar carried by the bar arm 48 is thus lowered into its original position it acts upon the arms 52 and links 54 to return the registering sectors 66 to their original positions. It will also be observed (see Fig. 8) that the upper end of the hammer 78 is provided with a lateral arm which projects under one side of the arm 52 so as to be engaged by the universal bar 51 to return the hammer 78 to original position at the same time that the registering sector 66 is returned to its original position. If carrying had been performed by any column the rear edge of the seat of stop plate 55 will strike against the link 54 at T and thereby reset the carrying pawl 80. The registering pawl 56 will be automatically returned to its position through the action of spring 85, as soon as the tension in spring 46 has been sufficiently decreased to permit of the spring 85 becoming operative.

Simultaneously with the foregoing operation the arm 86 (see Fig. 7), the lower end of which is fastened to shaft $h$ (Fig. 7) which in turn is operated by lever 33, the upper end of said arm 86 works in slot $y$ of link 87 (Fig. 7), the other end of said link is pivoted to arm H (Fig. 7) fastened to shaft 31. To the other end of this shaft is fastened arm 89 (Fig. 6) connected to link 90 which in turn is pivoted to arm 91 fastened to shaft 22. The ratchet sectors are mounted upon the shaft 22 (see Fig. 13) and the said shaft is provided with a wide keyway $22^a$ receiving narrow key lugs $22^c$ of the ratchet sectors.

With this construction it will be obvious that the rotation thus imparted to the shaft will operate to reset the ratchet sectors 21 and return them all to zero position, the slot $y$ in the link 87 and the slot $z$ in the link 90 taking care of all excess motion.

The motion communicated to sector 38 by the actuation of the lever 33 is transmitted to gear 92 mounted on shaft 93 said gear and sector being in mesh. A collar 94 (Fig. 9) is secured upon said shaft 93 at one end. One end of the helical spring 95 which is mounted upon said shaft is connected to said collar and the opposite end to worm gear 96 which with the worm 97 meshing therewith serves as a means of adjustment. The bearings of said worm are fastened to the frame. A drum 98 is mounted loosely upon said shaft 93.

A full downward movement of the lever communicates motion to sector 38, gear 92 in mesh therewith, and rotates shaft 93 on which said gear is mounted one complete revolution, thereby putting return spring 95 under higher tension. A belt 99, as shown in Figs. 7 and 8, is fastened or secured to carriage 30 and passes over pulley 100 mounted on one end of shaft 101, whereby the forward movement of the carriage transmits motion to the pulley 102 mounted on the opposite end of said shaft 101 and through the belt 103 to the drum 98 mounted on shaft 93.

On the extreme right hand end of shaft 93 is formed a tooth 104, as shown in Figs. 7 and 8, which upon return movement of the lever 33, engages pawl 105 fastened to drum 98 and thereby returns the drum and consequently the carriage operated by the belt to their original position, regardless of how far the carriage may have traveled. Toward the final end of the return of lever 33, the carriage will be a little more than home. At that point pawl 105 will be disengaged from tooth 104 by means of upright 106 engaging the pawl at N (Fig. 6) completely releasing the carriage and placing the same in condition for further action.

By means of the arrangement of the intermediate gear 68 and trigger 79, two double columns (debit and credit) can be carried at all times, the lower set of total wheels are in all respects similar to the upper set. Shaft 107 is carried by arm 108 as shown in Figs. 7, 8 and 10. The double arm 109 pivotally mounted on shaft 69 is capable of being so positioned as to allow one set of numeral wheels to be engaged at a time according to the position of the handle 110 secured thereto and adapted to operate the same. In the drawings the upper set of numeral wheels is engaged. In other words, the elevation or lowering of handle 110 will place the upper or the lower wheel section into mesh and if handle 110 be placed halfway, both numeral wheel sections are out of mesh, thus giving a position of the mechanism which may be utilized by the operator in case of having made an error as when the handle is so placed, the lever 33 can be operated and the machine perform its operations incident to this movement without entering the erroneous item on the total. Spring 111, the ends of which are respectively secured to arms 84, 108 maintains both arms in contact with the double arm 109.

Knobs 112 are applied to the ends of the two numeral wheel shafts 72 and 107 for the purpose of returning the numeral wheels to zero position, said knobs being formed with stems $112^a$ which are screwed into the sleeves 113. These sleeves 113 are slidable upon the shafts, being provided with fingers $113^a$ which are received within longitudinal grooves $113^b$ in the shafts. A coil spring $113^c$ is housed within each of the sleeves 113 and interposed between a head $113^d$ at the end of the shaft and a flange $113^e$ at the inner end of the sleeve. This spring 113ᵉ pushes the sleeve toward the side of the casing and holds a depression 113ᶠ in the base thereof in engagement with a lug 113ᵍ on the casing. The knob and shaft are thus normally locked against rotation, although by pulling outwardly upon the knob and disengaging the sleeve 113 from the stud 113ᵍ, the knob and shaft may be rotated for the purpose of returning the numeral wheels to zero position. Split washers 114 (Fig. 14) are keyed upon the shafts between the numeral wheels so as to catch upon the fingers 76 when the shafts are rotated in one direction, said split washers slipping over the fingers 76 when the shafts are rotated in the opposite direction. When resetting the numeral wheels the split washers will engage the fingers 76 of the various numeral wheels so that the same may all be returned to zero position by rotating the knob 112.

Ratchet sector 115 is connected to, or is the integral part of, arm 34 and when said arm is operated the notches engage the double acting pawl 116, thereby compelling a full stroke of the lever 33 in either way to operate the mechanism.

Dash pot 117, which is secured upon the frame of the machine immediately to the rear of the lever, is provided with a piston, the upper end of which is connected to a rod or beam 118, the opposite end of which terminates in a fork adapted to be engaged by a roller 119 on arm 120 which is mounted on shaft 93. The beam is pivotally secured to post 121. The mechanism described is for the purpose of retarding or preventing too ready movement of the lever.

Shutter 122 pivoted in the frame at 123 acts simultaneously with shaft 45 through the agency of spring 124 pulling link 125, as shown in Figs. 5 and 8. This arrangement will hold pawl 20 securely while the registration takes place.

Having described my invention, what I claim and desire to secure by Letters Patent is:

1. A machine of the character described, including a keyboard, a carriage, a plurality of spring actuated receiving sectors upon the carriage, locking pawls for the receiving sectors, a pawl trigger which is brought successively into operative relation to the various locking pawls as the carriage is advanced, a rock shaft actuated by the keyboard and operatively connected to the carriage escapement and the pawl trigger, a second rock shaft operatively connected with the receiving sectors so as to be moved simultaneously therewith, selective stop means controlled by the keys for governing the amplitude of movement of the said rock shaft, a totalizer, and means for transferring the results from the receiving sectors to the totalizer.

2. A machine of the character described, including a receiving mechanism having a series of receiving sectors which are moved amounts corresponding in amplitude to the values of the digits of the number which is being charged into the machine, numeral wheels, registering sectors for operating the numeral wheels, pivotally mounted registering pawls mounted to be swung into engagement with the receiving sectors and having their ultimate positions determined thereby, and means whereby the magnitude of movement of the registering sectors is governed by the positions of the registering pawls.

3. A machine of the character described, including a receiving mechanism having a series of receiving sectors which are moved amounts corresponding in amplitude to the values of the digits of the number which is being charged into the machine, numeral wheels, registering sectors for operating the numeral wheels, stop plates upon the registering sectors, and registering pawls mounted to have the ultimate positions thereof determined by the corresponding receiving sectors, the said registering pawls coöperating with the stop plates upon the registering sectors to govern the movement of the registering sectors.

4. A machine of the character described, including a receiving mechanism having a series of receiving sectors which are moved amounts corresponding in amplitude to the values of the digits of the number which is being charged into the machine, numeral wheels, registering sectors for operating the numeral wheels, stop plates upon the registering sectors, and pivotally mounted registering pawls mounted to be swung into engagement with the corresponding receiving sectors and having the ultimate positions thereof controlled according to the setting of the receiving sectors, the said registering pawls coöperating with the stop plates upon the registering sectors to govern the movement of the registering sectors.

5. A machine of the character described including a keyboard, a receiving mechanism including a plurality of sectors, means for successively setting the sectors as the keys are operated, numeral wheels, gearing for the numeral wheels, registering sectors meshing with the gearing, means for operating the registering sectors, registering pawls adapted to be moved into engagement with the sectors of the receiving mechanism and having the ultimate position thereof determined by the setting of the receiving sectors, and means whereby the magnitude of movement of the registering sectors is governed by the registering pawls.

6. A machine of the character described including a keyboard, a plurality of receiving sectors, means actuated by the keyboard for successively setting the receiving sectors according to the value of the keys operated, numeral wheels, gearing for turning the numeral wheels, registering sectors meshing with the gearing, means for operating the registering sectors, stop plates upon the registering sectors, and registering pawls adapted to be moved into engagement with the receiving sectors and having the ultimate position thereof controlled according to the setting of the receiving sectors, the said registering pawls coöperating with the stop plates upon the registering sectors to govern the movement of the registering sectors.

7. A machine of the character described, including a keyboard, a carriage, a plurality of spring actuated receiving sectors upon the carriage, locking detents for the receiving sectors, a rock shaft actuated by the keyboard, means controlled by the said rock shaft for advancing the carriage step by step and successively releasing the locking detents of the receiving sectors, a second rock shaft operatively connected with the receiving sectors so as to be moved simultaneously therewith, selective stop means for governing the amplitude of movement of the rock shaft, numeral wheels, registering sectors for operating the numeral wheels, registering pawls mounted to have the ultimate positions thereof determined by the corresponding receiving sectors, and means whereby the magnitude of movement of the registering sectors is governed by the registering pawls.

8. A machine of the character described, including a keyboard, a carriage, a plurality of spring actuated receiving sectors upon the carriage, means actuated by the keyboard for successively releasing the receiving sectors, a rock shaft operatively connected with the receiving sectors so as to be movable simultaneously therewith, selective stop means controlled by the keyboard for governing the amplitude of movement of the rock shaft, numeral wheels, registering sectors for operating the numeral wheels, registering pawls mounted to have their ultimate positions determined by the corresponding receiving sectors, and means whereby the magnitude of movement of the registering sectors is governed by the registering pawls.

In testimony whereof, I have hereunto signed my name in the presence of two subscribing witnesses.

FREDRICK W. B. SCHORADT.

In the presence of—
JOHN H. RONEY,
CLARENCE A. WILLIAMS.